United States Patent [19]

Endou et al.

[11] Patent Number: 5,065,414
[45] Date of Patent: Nov. 12, 1991

[54] PEDOMETER

[75] Inventors: Mikiya Endou; Motohiro Matsuura; Toshihiro Tsuzuki, all of Shizuoka, Japan

[73] Assignee: Marutakairyoki Kabushikigaisha, Yahata Fujieda, Japan

[21] Appl. No.: 509,046

[22] Filed: Apr. 13, 1990

[30] Foreign Application Priority Data

Apr. 17, 1989 [JP] Japan .................................. 1-44853[U]

[51] Int. Cl.$^5$ ............................................. G01C 22/00
[52] U.S. Cl. ....................................... 377/24.2; 377/5; 272/DIG. 5
[58] Field of Search .......................... 377/5, 24.2, 24.1; 272/DIG. 5

[56] References Cited

U.S. PATENT DOCUMENTS

| | | | |
|---|---|---|---|
| 4,220,996 | 9/1980 | Searcy | 377/5 |
| 4,337,529 | 6/1982 | Morokawa | 377/5 |
| 4,387,437 | 6/1983 | Lowrey et al. | 377/24.2 |
| 4,510,485 | 4/1985 | Tahar | 377/5 |
| 4,823,367 | 4/1989 | Kreutzfeld | 377/24.2 |

Primary Examiner—John S. Heyman
Attorney, Agent, or Firm—Paul A. Fattibene; Arthur T. Fattibene

[57] ABSTRACT

A pedometer which has a walking sensor for detecting a walking by the vibration of a walker's body, a counter for counting the number of walker's walking steps from the walking sensor, an indicator for indicating the value of the counter, a walking reference signal setter for storing a walking reference signal arbitrarily set in advance by the walker, a walking reference signal generator for generating a walking reference signal set by the walking reference signal setter, and sound producing unit for producing a sound upon reception of the output of the walking reference signal generator. Thus, the pedometer can measure a walking reference signal arbitrarily set in advance by a user or a pitch of user's walking when he actually walks with the pedometer by sounding the result as the walking reference signal to give the standard of the strength of his walking motion to the user, thereby providing the walking motion with high motion efficiency.

1 Claim, 2 Drawing Sheets

PEDOMETER

BACKGROUND OF THE INVENTION

1. Field of the Invention

This invention relates generally to a pedometer, and more specifically to a pedometer for establishing a walking pace.

2. Description of the Prior Art

Recently, jogging or walking is frequently carried out so as to promote health, diet, etc. The quantitative criterion of the motion is mostly judged by the number of steps a person walks in a day. A pedometer is often employed to measure the number of steps a person walks or jogs. Ways of walking or running are studied as motion for the sake of health at present. It is insufficient as the degree of effort of motion to merely walk for the purpose of increasing the number of walking steps. This does not measure the effort or strength of the walking motion. Further, it is also inconvenient to determine the lapse of time during walking by watching a wrist watch or the like.

SUMMARY OF THE INVENTION

Accordingly, an object of this invention is to provide a pedometer which can measure a walking reference signal arbitrarily set in advance by a user, or a pitch or pace of a user's walking when he actually walks with the pedometer by sounding the result as the walking reference signal to give the standard of the strength of the walking motion of the user. Thereby providing the walking motion with high motion efficiency.

This and other objects and features of the present invention will become apparent from the following detailed description in conjunction with the attached drawings.

DESCRIPTION OF THE PREFERRED EMBODIMENT

An embodiment of a pedometer according to the present invention will now be described with reference to the accompanying drawings. However, the embodiment is for illustration only, and the present invention is not limited to the particular embodiment.

Figure 1:
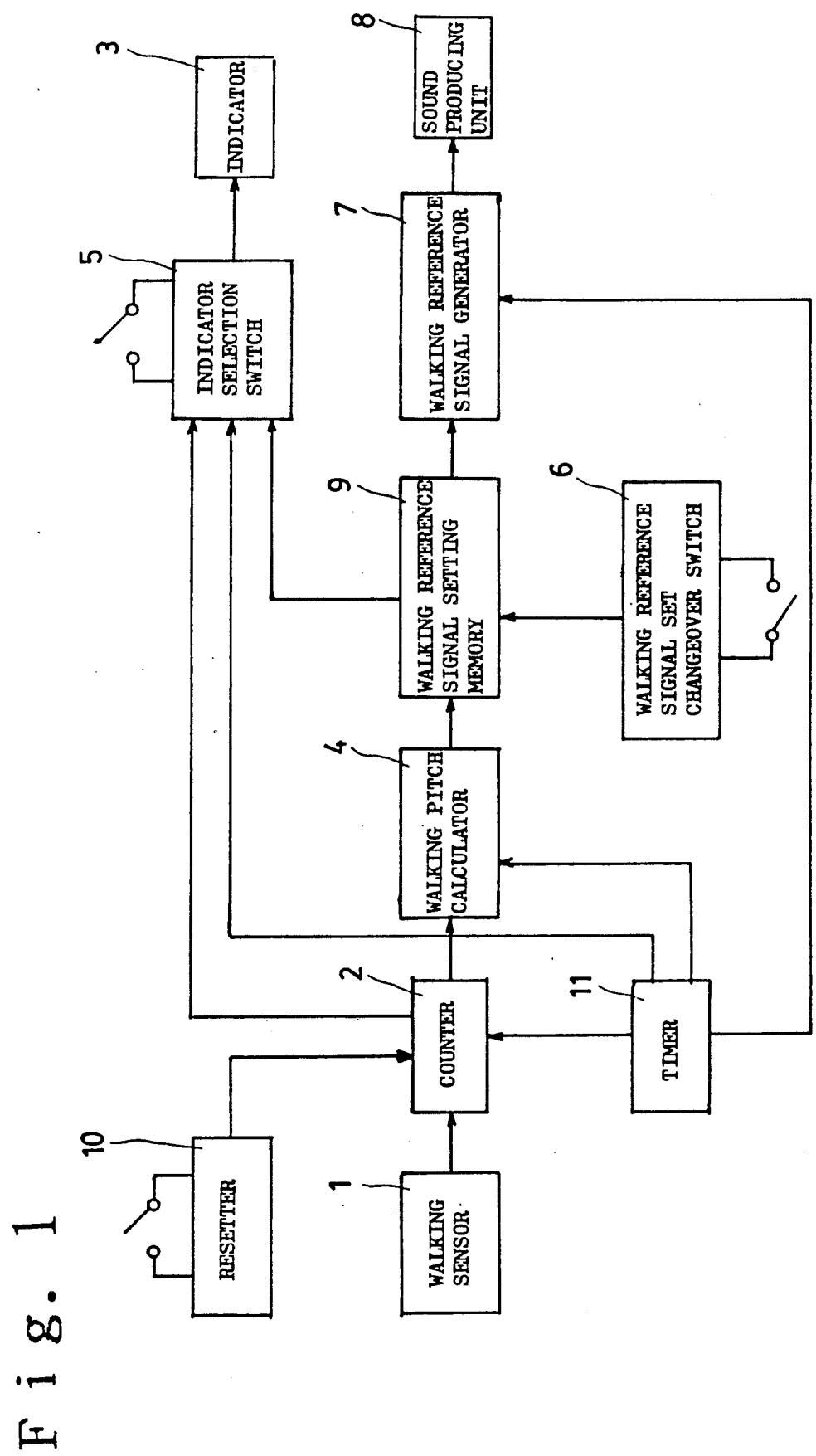
FIG. 1 is a block diagram of an embodiment of a pedometer according to the present invention.

FIG. 1 is a block diagram of an embodiment of a pedometer according to the present invention.

In FIG. 1, a pedometer of the invention is illustrated comprising a walking sensor 1 for detecting the vibration or motion of a user's body at the time of walking to detect his walking motion. A counter 2 for receiving an output from the walking sensor 1 and for counting the number of his walking steps. A resetter 10 is coupled to the counter 2 for arbitrarily clearing the content of the counter 2 generated from the walking sensor 1. A walking pitch calculator 4 receives the outputs of the walking sensor 10 and a timer 11 for calculating a period of time per one walk, i.e. a pitch or pace of the user's walking. The walking pitch calculator 4 can be any conventional calculator circuit, such as of the type disclosed in U.S. Pat. No. 4,220,996 which is herein incorporated by reference. The timer 11 can be any conventional circuit such as of the type disclosed in U.S. Pat. No. 4,387,437 which is herein incorporated by reference. The pedometer further comprises a walking reference signal setting memory 9 for arbitrarily setting a walking reference signal or setting the result of the walking pitch calculator 4 as a walking reference signal by a walking reference signal set changeover switch 6, and a walking reference signal generator 7 for generating a walking reference signal by the walking reference signal setting memory 9. The walking reference signal setting memory 9, and the walking reference signal set changeover switch 6 can be any conventional circuitry such as of the type disclosed in U.S. Pat. Nos. 4,220,996 and 4,510,485 which are herein incorporated by reference. The generator 7 also receives the output of the timer 11 and controls the number and production of the walking reference signal sound upon lapse of a predetermined period of time. An indicator 3 indicates a content selected by an indicator selection switch 5. The indicator selector switch 5 can be of the type disclosed in U.S. Pat. No. 4,510,485.

The operation of the embodiment described above will now be described.

In the normal operation of the embodiment of the pedometer, the walking sensor 1 detects the vibration or motion of the user's body at the time of walking to produce a signal output of one pulse at each walking step. The signal output of the walking sensor 1 is inputted to the counter 2, which counts the number of the user's walking steps. When the indicator selection switch 5 is selected to a walking step indication, the indicator 3 indicates the content of the counter 2. When the indicated number of steps is desired to be reset to "0", the resetter 10 is arbitrarily operated to clear the content of the counter 2, thereby resetting the counter 2 and indicating "0" on the indicator 3.

The operation of arbitrarily setting the walking reference signal of the embodiment will be described.

The indicator 3 is selected to a pitch or pace of walking indication of the walking reference signal by the indicator selection switch 5. Then, the indicator 3 indicates the number of the walking reference signals per one minute, thereby establishing the user's walking speed. The walking reference signal set changeover switch 6 is operated in this state thereby to vary the value of the pitch or pace on the indicator 3, thus setting an arbitrary walking reference signal. The set walking reference signal is stored in the walking reference signal setting memory 9.

The operation of an automatic walking reference signal setting will now be described.

Figure 2:
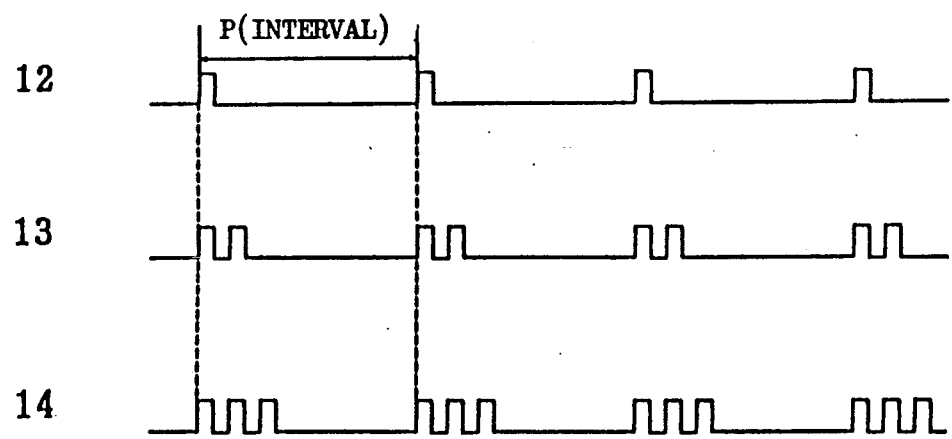
FIG. 2 is a waveform diagram of the output of sections of the invention.
Figure 3:
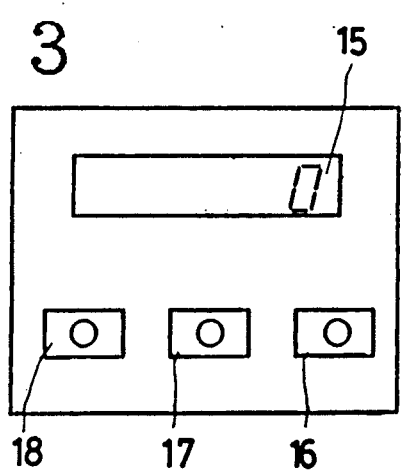
FIG. 3 is a view showing the external appearance of an example of the invention.

The output pulse produced from the walking sensor 1 is input to the walking pitch calculator 4. The calculator 4 also receives the output of the timer 11 to count the period of time between the pulses inputted from the walking sensor 1, thereby calculating a period of time of the walking steps. When the automatic walking reference signal set mode is set by operating the walking reference signal set changeover switch 6, the period of time of one walking step is calculated. The mean value of the calculated data per one step is calculated. When the user walks at more than the predetermined number of steps, the mean walking step period of time upon pressing of the switch 6 is input to the walking reference signal setting memory 9 to be stored in the memory 9. The walking reference signal generator 7 generates the walking reference signal according to the value of the walking reference signal setting memory 9 set by arbitrary or automatic setting, and generates, upon reception of the output of the timer 11, the walking reference signal at an interval of the walking reference signal P as shown by a waveform 12 in FIG. 2 at the time of starting user's walking. Upon the lapse of five minutes, the generator 7 produces two bleeps at the time of producing one sound as shown by a waveform 13 in FIG. 2. Upon lapse of eight minutes, the generator 7 produces three bleeps as shown by a waveform 14 in FIG. 2. With this function, the user can identify the lapse of periods of time of 5 minutes, 8 minutes. The signal produced from the walking reference signal generator 7 becomes a sound by a sound producing unit 8 to be transmitted to user's ears.

According to the present invention as described above, the embodiment of the pedometer can give a standard measure of the user's walking motion by providing the walking reference signal as the criterion of the walking motion for the user, thereby providing a predetermined walking motion. Since the embodiment of the pedometer can be arbitrarily set a method of setting the walking reference signal and can also be set by the actual walking pitch or pace, the embodiment can indicate the user's walking pitch and the user can accurately identify the actual walking pitch. Further, the number of walking reference signal sounds produced is varied upon laps or each period of time during walking motion so that the user can generally know the period of lapsed time from the start of his walking motion, thereby providing continuity to the user's walking motion.

We claim:

1. A pedometer comprising:
 a walking sensor for detecting walking motion by the movement of the walker's body;
 a counter, coupled to said walking sensor, for counting the number of walking steps;
 an indicator, coupled to said counter, for displaying the value of said counter;
 a walking reference signal setting memory means, for storing a walking reference signal set by the walker;
 a timer coupled to said counter;
 pace calculating means, coupled to said timer and said counter, for calculating a walking pace upon reception of the output of said counter, whereby said walking reference signal setting memory means is automatically set as a result of said pace calculating means;
 switch means, associated with said walking reference signal setting memory means, for switching between a reference signal set by the walker and an automatically set reference signal;
 walking reference signal generator means, coupled to said walking reference signal setting memory means and said timer, for generating a walking reference signal set by said walking reference signal setting memory means; and
 sound producing means, coupled to said walking reference signal generator means, for producing a sound upon reception of the output of said walking reference signal generator means.

* * * * *